No. 645,003. Patented Mar. 6, 1900.
P. PÉRATÉ.
PHOTOGRAPHIC CAMERA.
(Application filed Apr. 15, 1898.)
(No Model.) 2 Sheets—Sheet 1.

No. 645,003. P. PÉRATÉ. Patented Mar. 6, 1900.
PHOTOGRAPHIC CAMERA.
(Application filed Apr. 15, 1898.)

(No Model.) 2 Sheets—Sheet 2.

Witnesses:

Inventor
Paul Pératé
By James L. Norris.
Atty.

UNITED STATES PATENT OFFICE.

PAUL PÉRATÉ, OF PARIS, FRANCE.

PHOTOGRAPHIC CAMERA.

SPECIFICATION forming part of Letters Patent No. 645,003, dated March 6, 1900.

Application filed April 15, 1898. Serial No. 677,723. (No model.)

*To all whom it may concern:*

Be it known that I, PAUL PÉRATÉ, a citizen of France, residing at Paris, in the Department of the Seine, France, have invented certain new and useful Improvements in Photographic Cameras, of which the following is a specification.

My invention relates to photographic cameras, and has for its object to improve prior constructions, to dispense with a focusing-cloth during the focusing operation, and to reflect the rays from the lens by mirrors, one of which is mounted on and moves with the shutter itself. This object is accomplished in the manner and by the means hereinafter described and claimed, reference being made to the accompanying drawings, in which—

Figure 1:
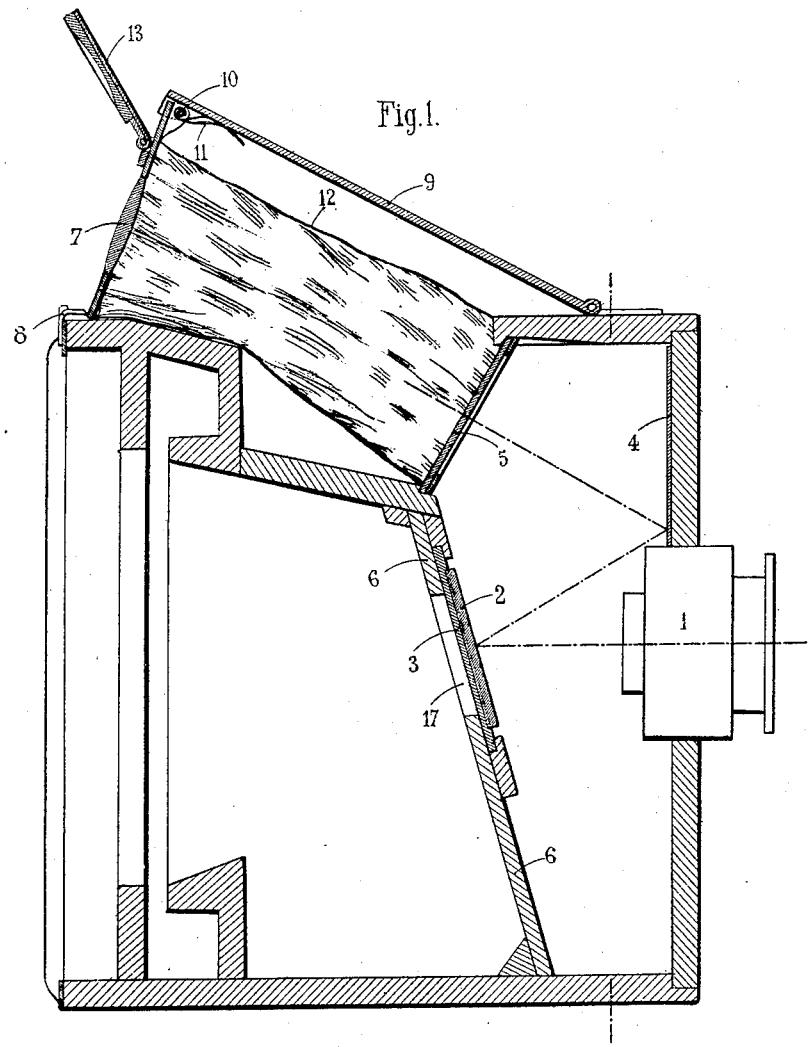
Figure 2:
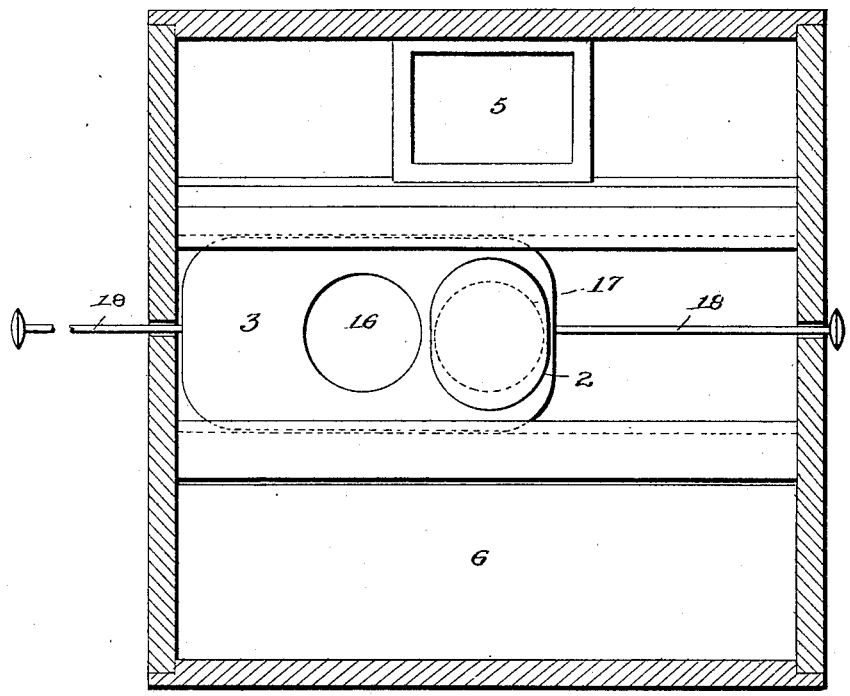

Figure 1 is a longitudinal central sectional view of a camera embodying my invention, and Fig. 2 is a detail transverse sectional view showing the shutter and the mirror carried thereby.

In carrying out my invention I arrange the focusing means in the interior of the camera and near the front part thereof. The rays entering the lens 1 are directed onto a mirror 2, carried by the movable shutter 3, which may be of any well-known type suitable for the purpose, and which shutter is carried by a partition 6, forming the front of the dark chamber. The angle of the mirror 2 with the axis of the lens 1 is about seventy-five degrees. This mirror is very light, so as not to retard the motion of the shutter. Another mirror 4 is vertically fixed against the inner side of the box above the lens. The ground-glass screen 5 is inclined at an angle of one hundred and twenty degrees with the horizontal. The ray of light from object-glass 1 is thus twice reflected—first, on the mirror 2, and, second, on the mirror 4—and then it is directed onto the focusing-screen 6. This double reflecting device allows the screen 5 to be placed in the main box and be thus sheltered from light-rays. The image thrown onto the focusing-screen is viewed by looking through a magnifying-glass 7, arranged on the top of the camera. There is a considerable advantage in placing the screen 5 in the box instead of in the wall of this box, where it is always hard to shelter the same from luminous rays.

The lens 7 is connected to a lid 9 by a hinge 10, provided with a spring 11, which tends to always increase the angle formed between the lens 7 and the cover 9. The same lens 7 is further connected to the screen 5 by a flexible bag or tube 12, so as to prevent the luminous rays from entering the box. This device allows of focusing without a focusing-cloth, even in a strong sun.

When out of use, the lens 7 is folded against the lid 9, which is closed down on the camera. A hook 8 secures it in position.

My device prevents the double reflection of the rays on the two faces of a glass mirror. This double reflection on mirrors inclined at an angle of forty-five degrees with the rays prevents clear images, for it is impossible in the case of photographic cameras to use metallic mirrors. These mirrors have a too small reflecting power and they are too quickly tarnished.

When it is desired to use the camera, one looks through the magnifying-glass 7 after having operated the shutter 3. Then it is to be focused by the direct inspection of the picture reflected onto the screen 5 through the magnifying-glass 7, and when the image reflected on the screen 5 is as desired one operates the shutter 3 by pushing it aside or withdrawing it in a well-known manner, and the rays act on the sensitive plate in the usual manner.

The shutter 3 may be operated in any suitable manner. The shutter setting and releasing mechanism constitutes no part of my present invention, but in Fig. 2 I have shown a simple means whereby the shutter can be reciprocated. In this figure the shutter 3 is provided with an opening 16 to pass in front of an opening in the partition, and the shutter is provided with rods 18, extending to the exterior of the camera and provided with suitable knobs, so that the shutter can be reciprocated, as is well known.

What I claim is—

In a camera, the combination with a movable shutter interposed between the lens and plate, of a mirror fixed on said shutter and moved thereby, a mirror arranged in the front of the camera in front of the shutter, said shutter being arranged at an angle so as to cause its mirror to reflect the image onto the mirror in the front of the camera, a ground glass arranged in an aperture in the camera at an angle to receive the image cast thereon by the mirror in the front of the shutter, and a knockdown or folding casing surrounding the ground glass, substantially as described.

In testimony whereof I have hereunto set my hand in presence of two subscribing witnesses.

PAUL PÉRATÉ.

Witnesses:
ALBERT MANGIN,
EDWARD P. MACLEAN.